United States Patent
Nanda et al.

(10) Patent No.: US 9,913,207 B2
(45) Date of Patent: Mar. 6, 2018

(54) METHODS AND APPARATUSES FOR PAGING IN HETEROGENEOUS NETWORKS

(71) Applicant: QUALCOMM Incorporated, San Diego, CA (US)

(72) Inventors: Sanjiv Nanda, Ramona, CA (US); Mehmet Yavuz, San Diego, CA (US); Chirag Sureshbhai Patel, San Diego, CA (US); Peerapol Tinnakornsrisuphap, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 13/793,867

(22) Filed: Mar. 11, 2013

(65) Prior Publication Data

US 2013/0235761 A1 Sep. 12, 2013

Related U.S. Application Data

(60) Provisional application No. 61/609,877, filed on Mar. 12, 2012.

(51) Int. Cl.
*H04W 48/16* (2009.01)
*H04W 68/12* (2009.01)
*H04W 48/20* (2009.01)
*H04W 84/04* (2009.01)
*H04W 16/32* (2009.01)

(52) U.S. Cl.
CPC .......... *H04W 48/16* (2013.01); *H04W 48/20* (2013.01); *H04W 68/12* (2013.01); *H04W 16/32* (2013.01); *H04W 84/045* (2013.01)

(58) Field of Classification Search
CPC .... H04W 84/045; H04W 48/20; H04W 16/32
See application file for complete search history.

(56) References Cited

U.S. PATENT DOCUMENTS

| | | | |
|---|---|---|---|
| 5,548,806 A | 8/1996 | Yamaguchi et al. | |
| 8,694,002 B1 * | 4/2014 | Narendran et al. | 455/435.1 |
| 2010/0027510 A1 | 2/2010 | Balasubramanian et al. | |
| 2010/0041393 A1 * | 2/2010 | Kwon et al. | 455/426.1 |

(Continued)

FOREIGN PATENT DOCUMENTS

| | | |
|---|---|---|
| WO | 2010017212 A1 | 2/2010 |
| WO | 2010049756 A2 | 5/2010 |

(Continued)

OTHER PUBLICATIONS

Taiwan Search Report—TW102108670—TIPO—dated Sep. 18, 2014.
International Search Report and Written Opinion—PCT/US2013/030611—ISA/EPO—Oct. 7, 2013.

*Primary Examiner* — Omer S Mian

(57) ABSTRACT

Wireless communication in a heterogeneous network may be facilitated by establishing connections with femto nodes based on page notifications from macro nodes to user equipment (UE). A UE in idle mode may monitor paging resources provided by a macro node, discover presence of a femto node based on signals received from the femto node, and establish a communicative connection with the femto node based on a page notification received from the macro node over the paging resources.

24 Claims, 13 Drawing Sheets

(56) References Cited

U.S. PATENT DOCUMENTS

| | | | |
|---|---|---|---|
| 2010/0056160 A1* | 3/2010 | Kim | H04W 36/0055 455/444 |
| 2010/0135248 A1 | 6/2010 | Aramaki et al. | |
| 2010/0279689 A1* | 11/2010 | Tinnakornsrisuphap et al. | 455/435.2 |
| 2011/0076960 A1* | 3/2011 | Yun et al. | 455/67.14 |
| 2011/0201354 A1* | 8/2011 | Park | H04W 84/047 455/456.1 |
| 2011/0256883 A1* | 10/2011 | Park | H04W 60/04 455/456.1 |
| 2012/0142352 A1* | 6/2012 | Zhang | H04W 36/0072 455/436 |
| 2012/0149377 A1* | 6/2012 | Su et al. | 455/438 |
| 2013/0028199 A1 | 1/2013 | Song et al. | |

FOREIGN PATENT DOCUMENTS

| | | |
|---|---|---|
| WO | 2011157290 A1 | 12/2011 |
| WO | 2012044019 A2 | 4/2012 |
| WO | 2012064602 A1 | 5/2012 |

\* cited by examiner

METHODS AND APPARATUSES FOR PAGING IN HETEROGENEOUS NETWORKS

CLAIM OF PRIORITY UNDER 35 U.S.C. §119

The present application for patent claims the benefit of U.S. Provisional Application No. 61/609,877, entitled "METHODS AND APPARATUSES FOR EFFICIENT PAGING IN HETEROGENEOUS NETWORKS," filed Mar. 12, 2012, assigned to the assignee hereof, and expressly incorporated herein by reference.

FIELD OF DISCLOSURE

Aspects of this disclosure relate generally to telecommunications, and more particularly to paging in heterogeneous networks and the like.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more robust wireless coverage to mobile devices. For example, low power base stations (e.g., which can be commonly referred to as Home NodeBs or Home eNBs, collectively referred to as H(e)NBs, femto nodes, pico nodes, micro nodes, etc.) can be deployed for incremental capacity growth, richer user experience, in-building or other specific geographic coverage, and/or the like. In some configurations, such low power base stations are connected to the Internet via a broadband connection (e.g., digital subscriber line (DSL) routers, cable or other modems, etc.), which can provide the backhaul link to the mobile operator's network. In this regard, low power base stations are often deployed in homes, offices, etc. without consideration of a current network environment.

SUMMARY

Example embodiments of the invention are directed to systems and methods for paging in heterogeneous networks.

In some embodiments, a method is provided for wireless communication in a heterogeneous network. The method may comprise, for example: monitoring, by a user equipment (UE) in idle mode, paging resources provided by a macro node; discovering presence of a femto node based on signals received from the femto node; and establishing a communicative connection with the femto node based on a page notification received from the macro node over the paging resources.

In other embodiments, an apparatus is provided for wireless communication in a heterogeneous network. The apparatus may comprise, for example: means for monitoring, by a UE in idle mode, paging resources provided by a macro node; means for discovering presence of a femto node based on signals received from the femto node; and means for establishing a communicative connection with the femto node based on a page notification received from the macro node over the paging resources.

In still other embodiments, a computer-readable medium is provided comprising code, which, when executed by at least one processor, causes the at least one processor to perform operations for wireless communication in a heterogeneous network. The computer-readable medium may comprise, for example: code for monitoring, by a UE in idle mode, paging resources provided by a macro node; code for discovering presence of a femto node based on signals received from the femto node; and code for establishing a communicative connection with the femto node based on a page notification received from the macro node over the paging resources.

In still other embodiments, another apparatus is provided for wireless communication in a heterogeneous network. The apparatus may comprise at least one processor and memory coupled to the at least one processor. The at least one processor may be configured to, for example: monitor in idle mode paging resources provided by a macro node; discover presence of a femto node based on signals received from the femto node; and establish a communicative connection with the femto node based on a page notification received from the macro node over the paging resources.

In still other embodiments, another method is provided for wireless communication in a heterogeneous network. The method may comprise, for example: obtaining, at a macro node, instructions to page a UE in idle mode; transmitting a page notification to the UE based on the obtained instructions; receiving information related to a femto node from the UE based on the page; and commanding the femto node to establish a communicative connection with the UE based on the information.

In still other embodiments, another apparatus is provided for wireless communication in a heterogeneous network. The apparatus may comprise, for example: means for obtaining, at a macro node, instructions to page a UE in idle mode; means for transmitting a page notification to the UE based on the obtained instructions; means for receiving information related to a femto node from the UE based on the page; and means for commanding the femto node to establish a communicative connection with the UE based on the information.

In still other embodiments, another computer-readable medium is provided comprising code, which, when executed by at least one processor, causes the at least one processor to perform operations for wireless communication in a heterogeneous network. The computer-readable medium may comprise, for example: code for obtaining, at a macro node, instructions to page a UE in idle mode; code for transmitting a page notification to the UE based on the obtained instructions; code for receiving information related to a femto node from the UE based on the page; and code for commanding the femto node to establish a communicative connection with the UE based on the information.

In still other embodiments, another apparatus is provided for wireless communication in a heterogeneous network. The apparatus may comprise at least one processor and memory coupled to the at least one processor. The at least one processor may be configured to, for example: obtain, at a macro node, instructions to page a UE in idle mode; transmit a page notification to the UE based on the obtained instructions; receive information related to a femto node from the UE based on the page; and command the femto node to establish a communicative connection with the UE based on the information.

In still other embodiments, another method is provided for wireless communication in a heterogeneous network. The method may comprise, for example: receiving, at a femto node from a macro node, a command to establish a communicative connection with a UE based on a page for the UE at the macro node while the UE is in idle mode; establishing the communicative connection with the UE based on the command; and providing one or more services associated with the page to the UE.

In still other embodiments, another apparatus is provided for wireless communication in a heterogeneous network. The apparatus may comprise, for example: means for receiving, at a femto node from a macro node, a command to establish a communicative connection with a UE based on a page for the UE at the macro node while the UE is in idle mode; means for establishing the communicative connection with the UE based on the command; and means for providing one or more services associated with the page to the UE.

In still other embodiments, another computer-readable medium is provided comprising code, which, when executed by at least one processor, causes the at least one processor to perform operations for wireless communication in a heterogeneous network. The computer-readable medium may comprise, for example: code for receiving, at a femto node from a macro node, a command to establish a communicative connection with a UE based on a page for the UE at the macro node while the UE is in idle mode; code for establishing the communicative connection with the UE based on the command; and code for providing one or more services associated with the page to the UE.

In still other embodiments, another apparatus is provided for wireless communication in a heterogeneous network. The apparatus may comprise at least one processor and memory coupled to the at least one processor. The at least one processor may be configured to, for example: receive, at a femto node from a macro node, a command to establish a communicative connection with a UE based on a page for the UE at the macro node while the UE is in idle mode; establish the communicative connection with the UE based on the command; and provide one or more services associated with the page to the UE.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
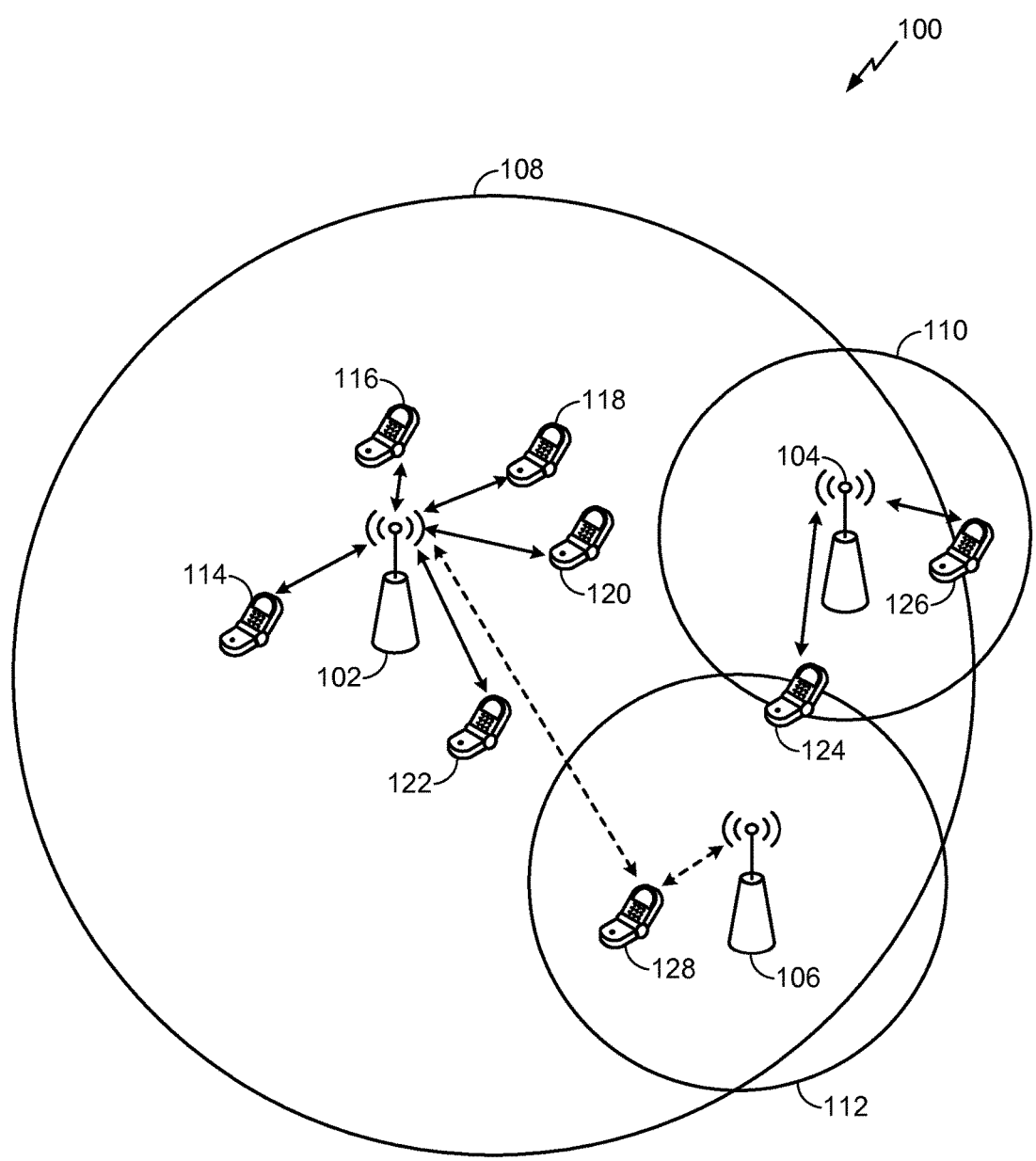
FIG. 1 is a block diagram of an example system that facilitates efficient paging in a heterogeneous network.

Aspects of the invention are disclosed in the following description and related drawings directed to specific embodiments of the invention. The term "embodiments of the invention" does not require that all embodiments of the invention include the discussed feature, advantage, or mode of operation, and alternate embodiments may be devised without departing from the scope of the invention. Additionally, well-known aspects of the invention may not be described in detail or may be omitted so as not to obscure more relevant details of the invention.

As described further herein, user equipment (UE) may register with a macro node to receive paging signals. Upon encountering a femto node, the UE can remain camped on the macro node, but can measure parameters of the femto node while in the femto node coverage area. The UE may subsequently engage one or more discovered femto nodes when in range based on receiving a page from the macro node. In this regard, a UE operating in an idle mode need not register with each femto node encountered as the UE moves throughput the coverage area of the macro node; rather registration can be reserved for instances when the UE is within the coverage area of the femto node and is paged to communicate in the wireless network.

In one example, upon receiving a page for the UE, the macro node may forward the page or related information to the UE and may redirect the UE to a discovered femto node. Thereafter, the UE may perform one or more functions on the femto node related to the page, such as engaging in a call—e.g., a voice call, data call, etc. Thus, the macro node may redirect the UE to a femto node for receiving calls or other services when the UE transitions from idle mode to active mode. When the UE transitions to idle mode, however, the UE may return to the macro node for execution of idle mode processes (e.g., monitoring paging resources). This differs from traditional heterogeneous networks where a UE may register with each discovered femto node when operating in idle mode. Instead, a single registration according to various embodiments herein may be sufficient for the UE to receive a paging signal when maneuvering through a larger macro node. By minimizing UE registration processes, UE battery power may be conserved and network signaling load may be lessened.

A low power base station, as referenced herein, may include a femto node, a pico node, micro node, home Node B or home evolved Node B (H(e)NB), relay, and/or other low power base stations, and may be referred to herein using one of these terms, though use of these terms is intended to generally encompass low power base stations. In general, a low power base station transmits at a relatively low power as compared to a macro base station associated with a wireless wide area network (WWAN). As such, the coverage area of the low power base station can be substantially smaller than the coverage area of a macro base station.

As used herein, the terms "component," "module," "system," and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Various aspects are also described herein in connection with a base station. A base station may be utilized for communicating with wireless terminals and may also be referred to as an access point, a Node B, evolved Node B (eNB), home Node B (HNB) or home evolved Node B (HeNB), collectively referred to as H(e)NB, or some other terminology.

The term "or" as used herein is intended to mean an inclusive "or" rather than an exclusive "or." Unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used in conjunction with various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, and any other short- or long-range, wireless communication techniques.

Various aspects or features will be presented in terms of systems that may include a number of devices, components, modules, and the like. It is to be understood and appreciated that the various systems may include additional devices, components, modules, etc., and/or may not include all of the devices, components, modules, etc. discussed in connection with the figures. A combination of these approaches may also be used.

Referring to FIG. 1, an example wireless communication system 100 is illustrated that facilitates efficient paging of one or more user equipments (UEs). System 100 comprises a macro node 102, which can be a macro base station or a femto, pico, or other low power base station node, in one example. System 100 also includes femto nodes 104 and 106, which can be substantially any type of low power base station, which may be associated with a femto node, or at least a portion thereof. The nodes 102, 104, and 106 provide respective coverage areas 108, 110, and 112. System 100 also includes a plurality of devices 114, 116, 118, 120, 122, 124, 126, and 128 that communicate with the nodes 102, 104, or 106 to receive wireless network access. These devices may be UEs, and may be referred to as such throughout the present disclosure.

As described, the femto nodes 104 and 106 can communicate with the wireless network (not shown) over a broadband connection. In addition, the femto nodes 104 and 106 can communicate with one another, and/or with the macro node 102, over a backhaul connection. For example, upon initialization, one or more of the femto nodes 104 and/or 106 can also communicate with one another to form a grouping (e.g., an ad-hoc network). This allows the femto nodes 104 and/or 106 to communicate to determine parameters related to serving the various devices connected thereto (e.g., resource allocations, interference management, and/or the like), in one example. Moreover, femto nodes 104 and 106 can automatically configure themselves to operate in the wireless network (e.g., set transmit power, network identifiers, pilot signal resources, and/or the like based on similar information received over a backhaul connection, over-the-air, or otherwise sensed from surrounding nodes). In this example, the femto nodes 104 and 106 can behave as plug-and-play devices requiring little user interaction to be provisioned on the wireless network.

In an example, device 128 may register with macro node 102. For example, such registration can occur upon initially communicating with macro node 102, upon transitioning to an idle mode following communication with femto node 106, and/or the like. As device 128 travels geographically throughout the coverage area of macro node 102, the device 128 may have discovered one or more femto nodes (e.g., femto node 106). For example, the device 128 may have moved within coverage area 112 of femto node 106. In an aspect, the device 128 may obtain and store information related to each femto node it discovers, but may not register with a femto node while in idle mode. Instead, the macro node 102 may handle paging operations and may decide whether the device 128 should be handed over to a femto node, such as femto node 106, based on receiving a paging message for the device 128.

For example, where a macro node 102 receives a page destined for the device 128, the macro node 102 may notify the device 128 of the page. Thereafter, the device 128 may search for new or recently-discovered femto nodes, such as femto node 106, and optionally establish a connection with one or more of the femto nodes. Furthermore, the device 128 may report one or more characteristics of the femto node 106 to the macro node 102, such as, but not limited to cell identification and/or signal strength information. Macro node 102 may, thus, process the received information and may determine whether the macro node 102 or femto node 106 should handle the subsequent service related to the page.

Where the macro node 102 determines that the femto node 106 should handle the subsequent service, the macro node 102 may redirect the device 128 to the femto node 106 for active (connected-mode) service. The device 128 can thus communicate with the femto node 106 in active mode to perform one or more services related to the paging message (e.g., receiving an incoming call, engaging in a call or other message on which the page is based, and/or the like). Once the device 128 transitions back to idle mode, femto node 106 can redirect the device 128 to the macro node 102 for camping. In an alternative aspect, device 128 may transition back to idle mode and camp on macro node 102 independent of a command from the femto node 106 to do so. Camping may refer to handling of idle mode procedures at a device, such as monitoring a paging channel.

Figure 2:
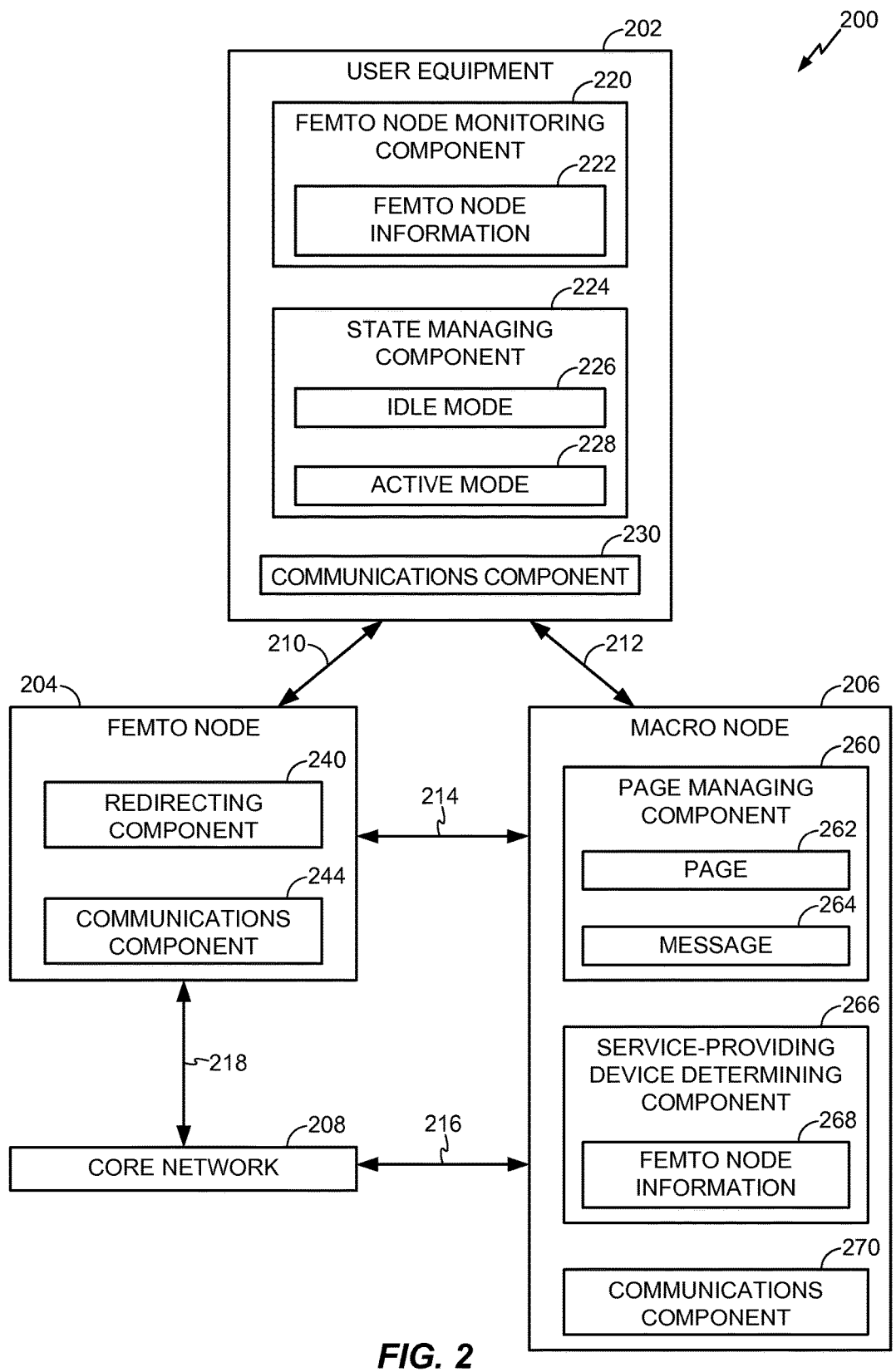
FIG. 2 is a block diagram of an example system that facilitates efficient paging in a heterogeneous network.

Turning to FIG. 2, related aspects of a heterogeneous network 200 are illustrated. As shown, heterogeneous network 200 may include a UE 202, one or more femto nodes 204, and a macro node 206. The one or more femto nodes may be connected to the macro node 206 and/or a core network 208 via links 214, 216, and/or 218. Core network 208 can include one or more components of a wireless network, such as one or more gateways, a mobility management entity, a supporting node, a home location register, an operation, administration, and maintenance server, etc. In an aspect, links 214, 216, and/or 218 may be a backhaul link, and may be a wired or wireless link. The UE 202 may be connected to the one or more femto nodes 204 and/or macro node 206 via wireless links 210 and/or 212.

In an aspect, UE 202 may be configured to communicate wirelessly with one or more network devices, such as femto node 204 and/or macro node 206. UE 202 may include a femto node monitoring component 220 for discovering one or more femto nodes 204 by, for example, receiving pilot signals and/or beacons from the one or more femto nodes 204. Furthermore, femto node monitoring component 220 may store femto node information 222 associated with each of the one or more femto nodes 204 that the UE 202 has discovered over a certain past duration. In an aspect, femto node information 222 may include pilot spreading code such as primary scrambling code (PSC) or primary cell identifier (PCI), cell identification (ID) information, signal information, such as signal strength, and/or other characteristics associated with each of the one or more femto nodes 204.

In a further aspect, UE 202 may include a state managing component 224 for determining whether UE 202 operates in idle mode 226 or active mode 228 at a given time. For example, in an aspect, where UE 202 is not currently engaged in a data call with a network entity, such as femto node 204 or macro node 206, or at a period of time following termination of a data call, state managing component 224 may assign a current UE mode as idle mode 226. Alternatively, where UE 202 is to establish a data call or otherwise communicate with an entity of core network 208, the state managing component 224 may assign the current UE mode to active mode 228. Allowing transitioning between the idle mode 226 and active mode 228 can conserve resources of UE 202 since the UE 202 need not maintain an active connection to femto node 204 or macro node 206 at all times. The UE 202 can be paged while in idle mode, as described, to indicate when UE 202 is to establish an active connection with core network 208 to receive communications therefrom.

In addition, UE 202 may include a communications component 230 for sending and receiving signals from one or more network entities, such as, but not limited to, one or more femto nodes 204, macro node 206, etc. In an aspect, received signals may include paging signals, data signals, pilot signals, and/or other over-the-air signals. Additionally, communications component 230 may be configured to transmit signals to one or more femto nodes 204 and/or macro node 206, such as, but not limited to, data signals indicating characteristic information associated with one or more femto nodes such as femto node 204, measurement report information, and/or other information that may be utilized by a network entity.

In addition, heterogeneous network 200 may include one or more femto nodes 204, which may be configured to communicate with, and provide services related to a page to one or more UEs 202. For example, the services can correspond to establishing a call for UE 202, indicating a message from the core network 208 to UE 202, and/or the like. In an aspect, femto node 204 may include a redirecting component 240 for redirecting a UE 202 from the femto node 204 to the macro node 206, for example, when the UE 202 switches from active mode to idle mode. Additionally, femto node 204 may include a communications component 244 for establishing one or more links with, for example, macro node 206, one or more UEs 202, and/or the core network 208. Furthermore, communications component 244 may be configured to transmit or receive signals to and/or from macro node 206, one or more UEs 202, and/or the core network 208. In a further aspect, communications component 244 may be configured to receive commands from macro node 206. Such commands may include a command for femto node 204 to establish a link with UE 202 and provide a page and/or related services to UE 202.

In an additional aspect, heterogeneous network 200 may include a macro node 206, which may be configured to manage UE paging and may provide idle mode services to one or more UEs 202. In an aspect, macro node 206 may include a page managing component 260 for transmitting a notification message to UE 202 where page managing component 260 has determined that a page 262 exists for UE 202. In a further aspect, page managing component 260 may store and/or transmit one or more messages 264 associated with page 262 to UE 202. In an alternative aspect, a network component other than macro node 206, such as a network component above and/or one in communication with one or more macro cells 206, may forward message 264 to femto node 204 for forwarding to UE 202 or may forward message 264 directly to UE 202. For example, page managing component 260 may indicate to UE 202 that page 262 exists for UE 202 over the air, but any messages or data associated with page 262 may be forwarded to UE 202 from the core network 208 through femto node 204.

In addition, macro node 206 may include a service-providing device determining component 266 for determining whether services related to a page are to be provided to UE 202 from the macro node 206 or one or more femto nodes 204. In an aspect, service-providing device determining component 266 may receive femto node information 268 from one or more UEs 202, and may store and/or analyze this femto node information to determine whether the macro node 206 or the femto node 204 provides data services related to a page to UE 202. In an aspect, femto node information may include cell ID information, femto node signal strength information, and/or other characteristic information related to the one or more femto nodes 204 in heterogeneous network 200. In an example aspect, where femto node information includes femto node signal strength information, service-providing device determining component 266 may compare the received and stored femto node signal strength information with the signal strength of macro node 206 or one or more stored threshold signal strength values to determine which network entity should provide call services to UE 202.

In addition, macro node 206 may include communications component 270 for initiating one or more links with, for example, one or more UEs 202, one or more femto nodes 204, core network 208, and/or any other network entities in heterogeneous network 200. In a further aspect, communications component 270 may be configured to provide idle mode services to one or more UEs 202, such as, but not limited to, providing overhead and/or control signaling, timing information, communication protocol information, location information, or other idle mode procedures. Additionally, communications component 270 may be configured to perform one or more functions related to the page, such as engaging in a call with a UE 202, for example, when UE 202 is in active mode. In a further aspect, communications component 270 may be configured to redirect one or more UEs 202 to establish communication links with one or more femto nodes 204, for example, where service-providing device determining component 266 determines that a femto node 204 will transmit data related to a page to UE 202.

According to an example, state managing component 224 can manage idle mode 226 for UE 202. In this example, communications component 230 monitors a paging channel of macro node 206 regardless of other femto nodes encountered as UE 202 moves throughout a coverage area of macro node 206. Upon detecting femto nodes, such as femto node 204, however, femto node monitoring component 220 can store femto node information 222 regarding the femto node 204. The femto node information 222 can include information broadcast by femto node 204 for initiating communications therewith, such as PSC used by the femto node pilot channel, resources for requesting a connection with femto node 204, an operating frequency of femto node 204, a measured signal quality or strength of femto node 204 pilot and/or other channels, restricted association information regarding the femto node 204, and/or the like.

In this example, page managing component 260 can receive a page 262 for UE 202. The page can correspond to a call, message, and/or the like received for UE 202 at core network 208. In this example, communications component 270 can transmit a paging signal for UE 202 over a paging channel, and communications component 230 can receive the paging signal. Based on the signal, for example, femto node monitoring component 220 can communicate the femto node information 222 to macro node 206. This can include previously determined information or information determined based on receiving the paging signal. In any case, the femto node information 222 may include at least signal quality or strength to nearby femto nodes and an identity of these femto nodes (e.g., PSC, cell ID, etc.). Service-providing device determining component 266 can receive the femto node information 268, and can determine whether to redirect the UE 202 to one or more femto nodes for active (connected-mode) service, such as femto node 204 (e.g., where measurements of femto node 204 reported in the femto node information 268 are at least a threshold difference from measurements reported for macro node 206, where the UE 202 is permitted to access femto node 204, etc.).

Where service-providing device determining component 266 determines to perform redirection or handover, service-providing device determining component 266 can prepare femto node 204 for the redirection or handover, and instruct UE 202 to connect to femto node 204. State managing component 224, in this regard, operates UE 202 in active mode 228, and communications component 230 begins communicating with femto node 204 to process data related to the page. Once state managing component 224 transitions UE 202 back to idle mode 226, redirecting component 240 can cause UE 202 to reselect to macro node 206 for camping and receiving paging signals. In an aspect, redirecting component 240 may receive a command from femto node 204 to redirect UE 202 to macro node 206 when UE 202 transitions to idle mode 226. In an alternative embodiment, redirecting component 240 may redirect UE 202 back to macro node 206 independently, without receiving a command to do so from femto node 204.

Figure 3:
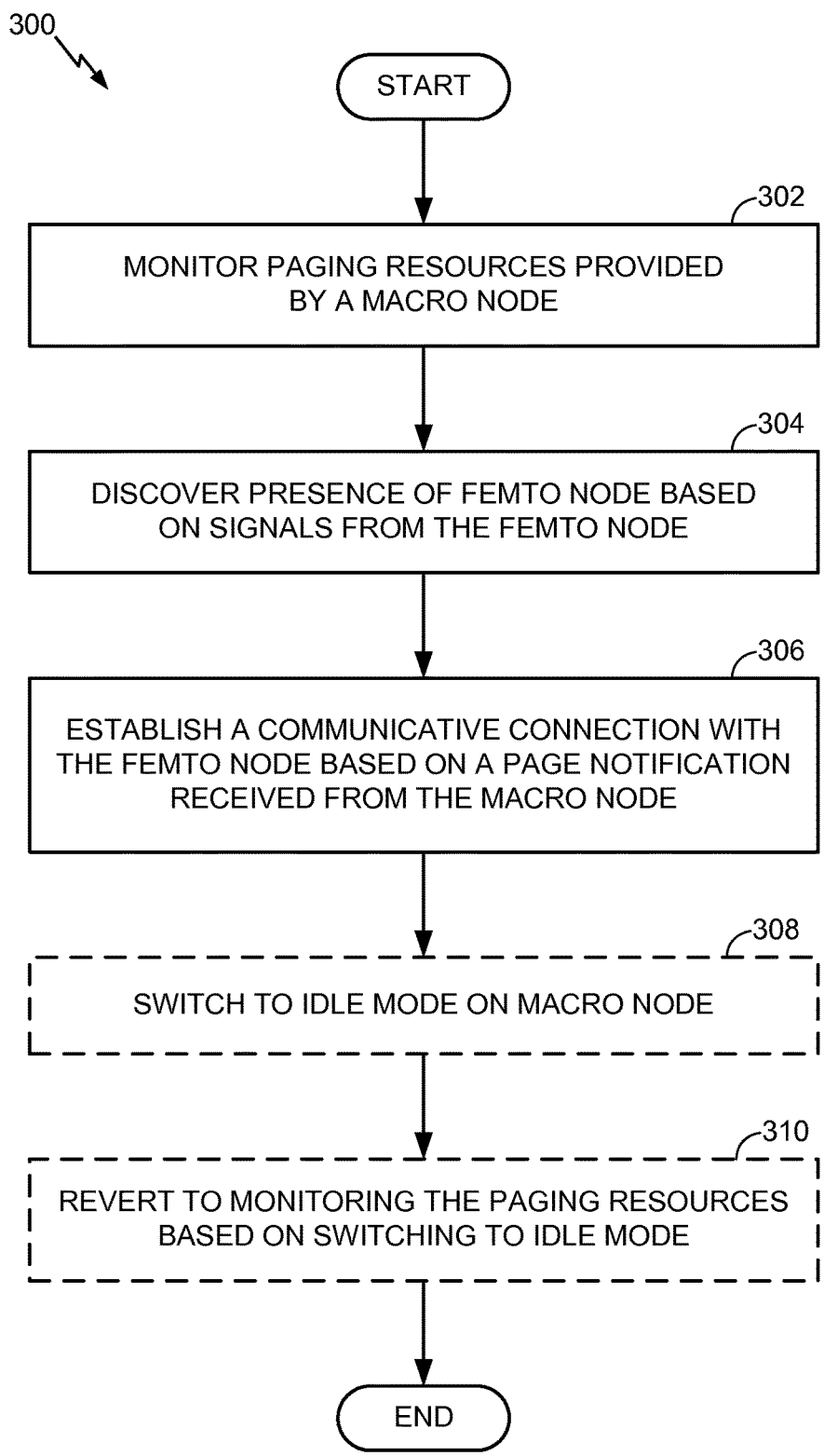
FIG. 3 is a flow chart of an aspect of an example methodology for efficient paging and call execution in a heterogeneous network at a UE.
Figure 4:
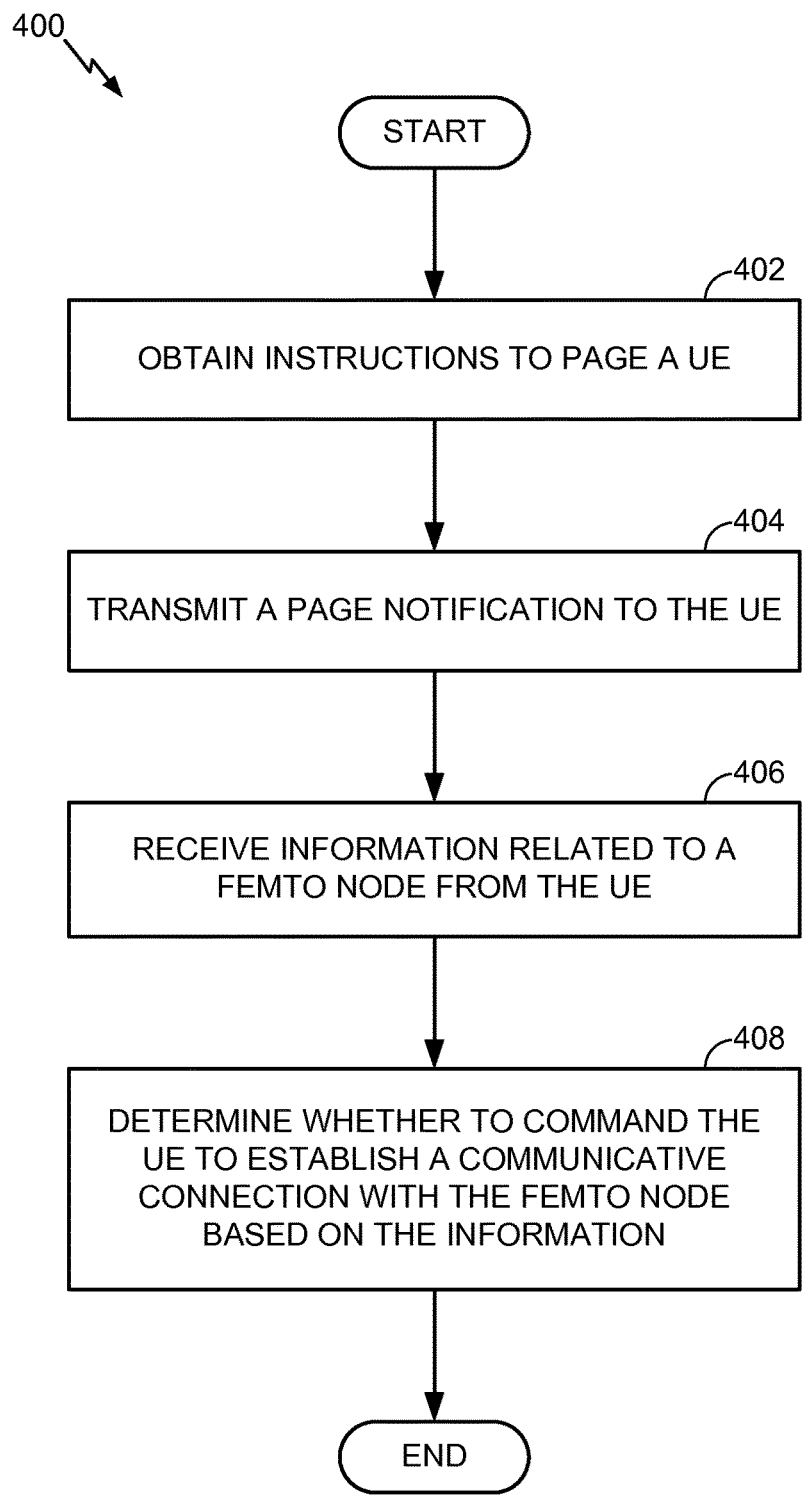
FIG. 4 is a flow chart of an aspect of an example methodology for efficient paging and call execution in a heterogeneous network at a macro node.
Figure 5:
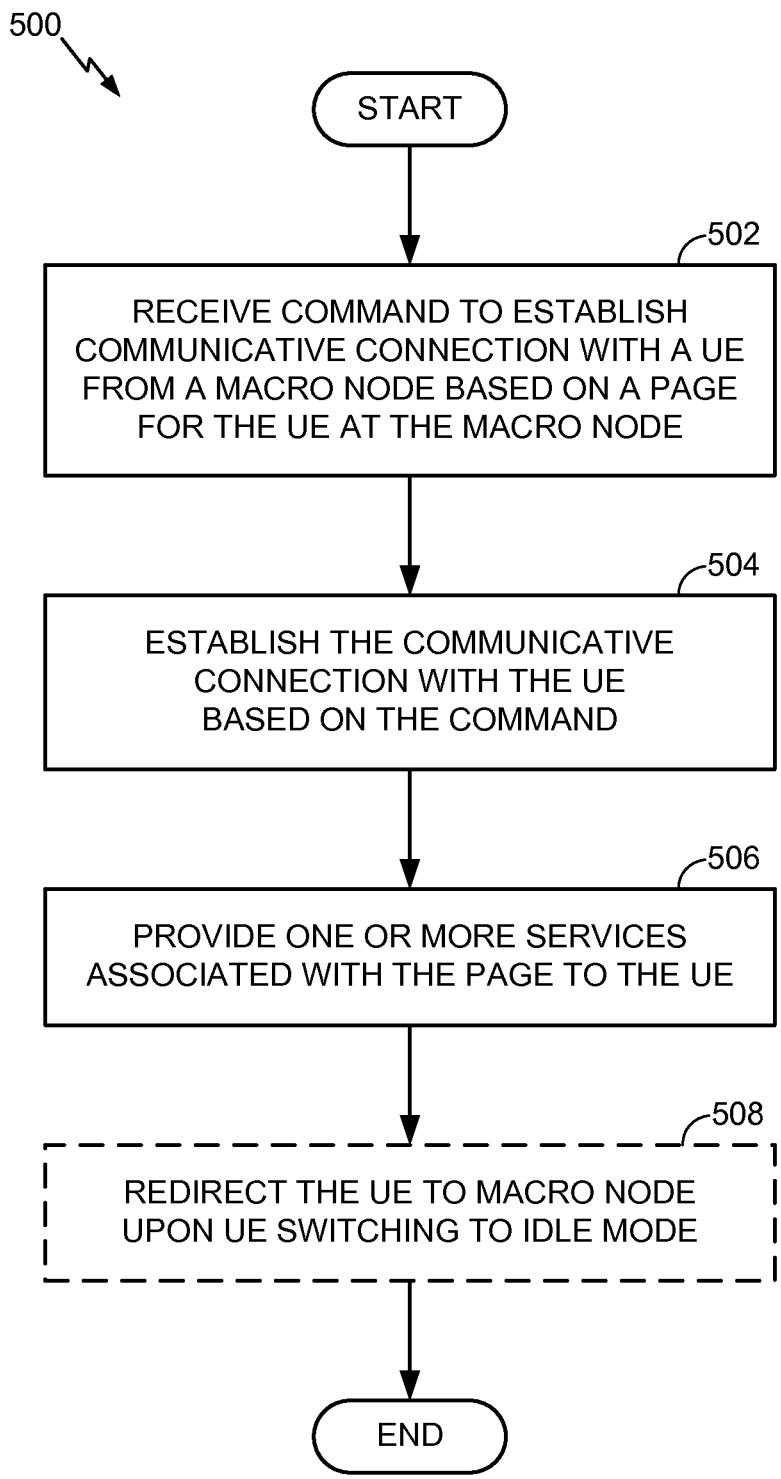
FIG. 5 is a flow chart of an aspect of an example methodology for efficient paging and call execution in a heterogeneous network at a femto node.

Referring to FIGS. 3-5, example methodologies relating to efficient paging of UEs in a heterogeneous network are illustrated. While, for purposes of simplicity of explanation, methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 3, an example methodology 300 is displayed that facilitates efficient paging and data communication in a heterogeneous network. In an aspect, at block 302, paging resources provided by a macro node can be monitored while operating in an idle mode. In an aspect, the paging resources may include a paging channel, and/or other channels over which the macro node transmits signals for purposes of providing idle mode services, such as, but not limited to, providing overhead data and/or control services. In a further aspect, at block 304, presence of one or more femto nodes can be discovered, based on signals received from the femto node. These signals received from the femto node may include, for example, pilot or beacon signals. Further, though presence of a femto node is discovered through routine idle mode search procedures, camping may continue on the macro node without registering with the femto node. Rather than discard femto node information received during such idle mode search procedures, however, information such as the cell ID of the femto node, signature of the femto node pilot (e.g., the pilot pseudo-random noise (PN) or PSC), etc., may be stored for future use.

In addition, when the macro node receives an incoming page, a paging signal, such as a page notification, can be received from the macro node over the paging resources based on camping thereon. In this example, at block 306, a communicative connection can be established with the femto node based on receiving the page notification from the macro node. Specifically, upon receiving the incoming page notification, information regarding femto nodes discovered at block 304 can be provided to the macro node, and establishing the communicative connection at block 306 can be part of a redirection or handing over to the femto node. In other examples, upon receiving the page notification from the macro node at 306, the communicative connection can be established by initiating the redirection or handover to the femto node based on information discovered at block 304.

In an additional aspect, once the communicative connection with the femto node is terminated, which may coincide with the completion of a call or other detected inactivity, for example, an idle mode on the macro node can be switched to at block 308 to conserve resources, as described. Furthermore, this can cause reversion to monitoring the paging resources from the macro node based on switching to idle mode at block 310.

Turning to FIG. 4, a methodology 400 for efficient paging from a macro node in a heterogeneous network is illustrated. In an aspect, instructions to page a UE can be obtained at block 402. As a result of obtaining instructions to page the UE, a page notification can be transmitted to the UE at block 404. This can occur over paging resources assigned to the UE, for example.

In an additional aspect, at block 406, information related to a femto node can be received from the UE, which can be based on the page notification transmitted to the UE. For example, the information may include a cell ID, a signal strength associated with the femto nodes, and/or other characteristic information related to the femto node. The information can be discovered by the UE when moving throughout a coverage area and discovering one or more femto nodes.

At block 408, it can be determined whether to command the UE to establish a communicative connection with the femto node based on the information. In an aspect, this communicative connection may be used to provide active mode services to the UE, such as, but not limited to, carrying voice and/or data traffic to the UE. In a further aspect, the command may trigger connection procedures, which can include negotiating with/requesting the femto node to prepare for handling the UE based on the page by, for example, using handover procedures to allocate traffic channel resources and/or page the UE through the femto node. Once this negotiation has completed or the command has been carried out, the UE can be redirected or handed over to the femto node via the communicative connection. In some aspects, this redirection may take one or more of several forms. For example, the UE can be commanded to establish a link with a femto node via a specific channel assignment command. In an alternative aspect, the UE can be commanded to negotiate resources and/or configuration parameters with the femto node. In any event, the effect is that the UE communicates with the femto node based on the page (e.g., to handle an incoming call, message, or other data related to the page).

In a further aspect, once the communicative connection with the femto node has been terminated, the UE may be tuned back to the macro node to receive idle mode service. As a corollary to the termination of the connection, the femto node may remove the UE context and may deregister the UE from the femto node.

In an alternative aspect, once the UE receives the page for initiating a connection, the UE may immediately connect to a femto node detected by searching for pilots and/or beacons on the femto node frequency. Additionally, the UE may perform handshaking and other procedures with this femto node, which may trigger the femto node to establish a data bearer with the data gateway (e.g., serving general packet radio service (GPRS) support node (SGSN) or serving gateway (S-GW)) and hence redirect the data directly to the femto node without invoking the macro to handover procedure described above.

In an additional aspect, where a UE wishes to initiate a call, the UE may search for femto node pilot signals. Where a sufficiently strong femto pilot is detected, the UE may initiate an uplink connection with the femto node to place the call. In an additional aspect, after receiving a page notification from a macro node, the UE may search for a femto node pilot signal and initiate a connection with the femto node to receive services associated with the received page notification (e.g., voice and/or data services associated with the page notification).

Alternatively or additionally, after detecting a strong femto pilot, a UE may notify the macro node about its presence in a femto node coverage area. As a result, the macro node may then initiate handover or redirection procedures with the reported femto and may notify the UE of the initiation of the procedures, after which the UE may proceed with the connection on the femto cell.

FIG. 5 presents a methodology 500 for efficient paging and call completion in a heterogeneous network at a femto node. In an aspect, at block 502, a command to establish a communicative connection with a UE can be received from a network node, such as, but not limited to, a macro node, based on a page for the UE received from the core network and/or stored at the network node. For example, the command can be received from the network node as a command to receive the UE in active mode handover.

A communicative connection can be established with the UE based on the command at block 504. For example, this can include receiving handover of the UE by receiving a request to establish a connection therewith, providing resources to the UE (or to the network node for providing to the UE) over which to establish the connection, and/or the like.

Furthermore, one or more services associated with the page may be provided to the UE at block 506. Thus, based on the presence of a page at a network node, services and/or communications regarding the page can continue from a different node, such as a femto node. Additionally, where data has been transmitted to the UE, and/or following a time period since data is received from the UE, the UE may switch to idle mode from active mode. Upon switching to idle mode, the UE can be redirected to a macro node (e.g., the network node or a macro node related thereto) in order that the UE may receive idle mode services from the macro node at block 508.

Furthermore, in some heterogeneous networks, macro node coverage may not be uniform or consistently reliable. In this case, where a UE operating in idle mode loses macro node coverage but finds a sufficiently-strong femto node, the UE may determine to register with the femto node. In such an aspect, both incoming and outgoing calls/connections may be handled through the femto node until the UE again finds a sufficiently-reliable macro node for registration.

In a further aspect of the present disclosure, as a UE travels throughout a heterogeneous wireless network, the UE may report its state (e.g., stationary, semi-stationary, fast moving, etc.) to one or more network entities, such as, but not limited to a macro node. Based on the reported state, the macro node may direct the UE to register with a nearby femto node. For example, if a UE is stationary and/or under coverage of one femto node for a relatively long period of time, it may be desirable to allow the femto node to handle incoming and/or outgoing calls of the UE to reduce signaling load on the network and allow faster call set-ups. Therefore, based on a UE state, such as, but not limited to, UE traveling speed, time of day, established daily UE schedule or regimen, etc., the macro network may determine that a femto node may be better suited to handle paging and incoming call establishment and functionality.

Alternatively, the UE may determine that whether to register on a femto node or macro network based on its state with no macro direction or command. For example, a UE in a fast-moving state may determine that it will register on macro networks and camp on the macro network after the registration until its state has changed, for example, to a more slow-moving state. For example, the UE that previously registered with the macro network may determine that it will camp on a discovered femto node upon becoming stationary.

In an additional aspect of the present disclosure, in an effort to avoid frequent handoffs and registrations while moving, for example, in a neighborhood with dense femto node deployment, designated pilot/control (e.g., paging) channels may be operated on a different radio frequency (RF) than the operational frequency associated with the UE, which may be a service channel where the UE is served. In an aspect, the UE may monitor this dedicated pilot/control channel during idle mode. In some examples, a limited number of femto nodes in the example neighborhood (e.g., one femto in each paging area cluster, as related to a location area code (LAC), routing area code (RAC), tracking area code (TAC), and serving as cluster head) may activate these channels so that idle-mode handoffs and/or registrations may be minimized Furthermore, the power on these channels may be set to be greater than that on the operational pilot/control channels to cover a cluster area, such as the example neighborhood, with the limited number of femto nodes. In addition, when connected mode service is initiated, the UE may search for pilots on the operational channel/frequency and initiate a connection with a nearby femto node that is found to have sufficiently good channel quality. Alternatively or additionally, a communicative connection may be established through a "cluster head," which may be a representative femto node of a cluster, on its regular channel and subsequently handoff the UE to another, stronger femto node that may be detected by the UE. Essentially, this example methodology creates a two-layer network: a few femto nodes transmitting pilot/paging/control channel on one radio frequency different from the operational radio frequency used by all femto nodes in a cluster.

It will be appreciated that, in accordance with one or more aspects described herein, inferences can be made regarding determining a femto node for handling processing related to a paging signal, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
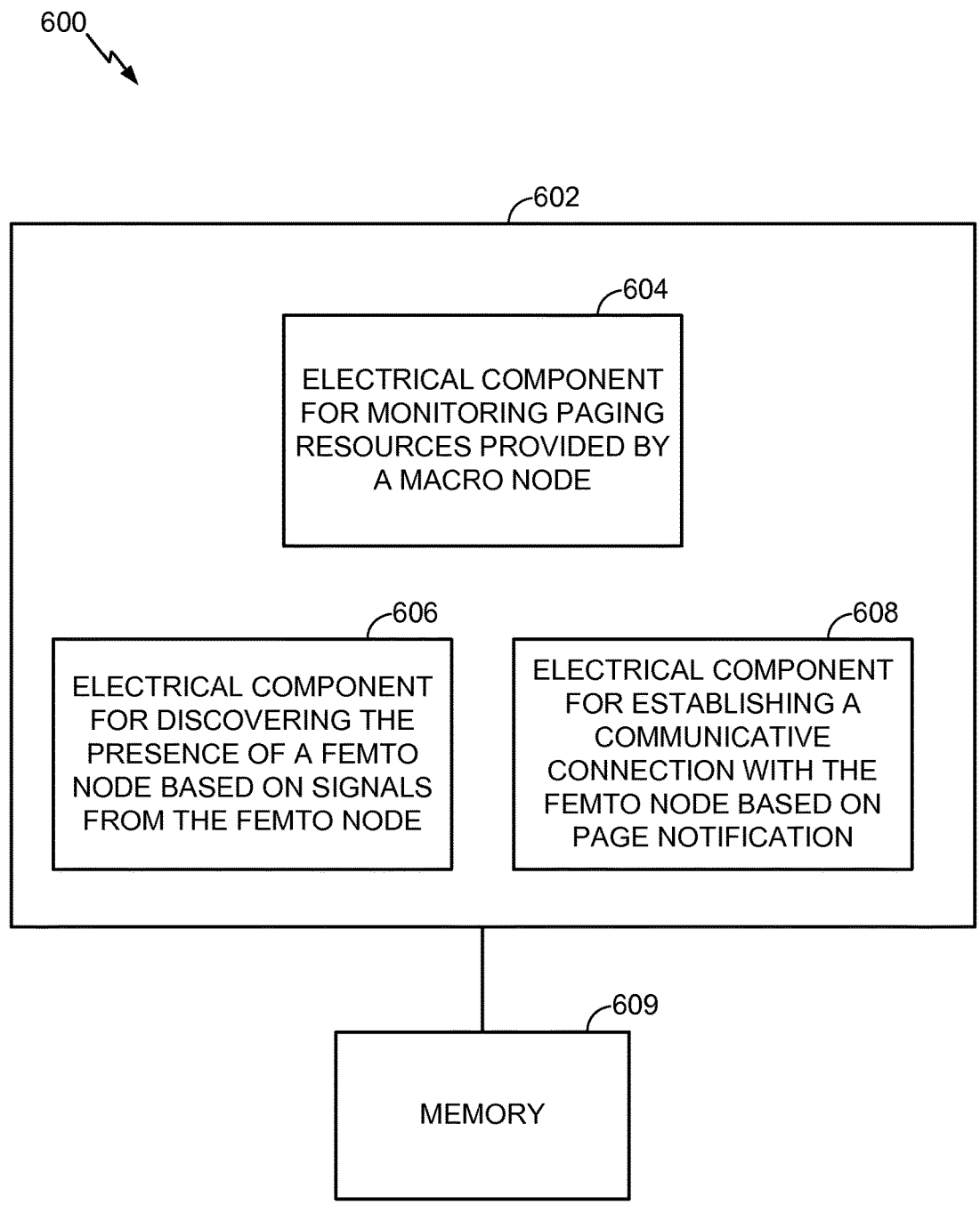
FIG. 6 is an electrical component diagram depicting aspects of a UE according to the present disclosure.

With reference to FIG. 6, illustrated is a system 600 for efficient paging of UEs in heterogeneous networks. System 600 can reside, for example, at least partially within a UE. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include an electrical component 604 for monitoring paging resources provided by a macro node. For example, electrical component 604 can include communications component 230, as described above.

Further, logical grouping 602 can include an electrical component 606 for discovering the presence of a femto node based on signals from the femto node. For example, electrical component 606 can include femto node monitoring component 220, as described above. In addition, logical grouping 602 can include an electrical component 608 for establishing a communicative connection with the femto node based on a page notification. For example, electrical component 608 can include communications component 230, as described above.

Additionally, system 600 can include a memory 609 that retains instructions for executing functions associated with the electrical components 604, 606, and 608. While shown as being external to memory 609, it is to be understood that one or more of the electrical components 604, 606, and 608 can exist within memory 609. In one example, electrical components 604, 606, and 608 can comprise at least one processor, or each electrical component 604, 606, and 608 can be a corresponding module of at least one processor. Moreover, in an additional or alternative example, electrical components 604, 606, and 608 can be a computer readable medium, where each electrical component 604, 606, and 608 can be corresponding code.

Figure 7:
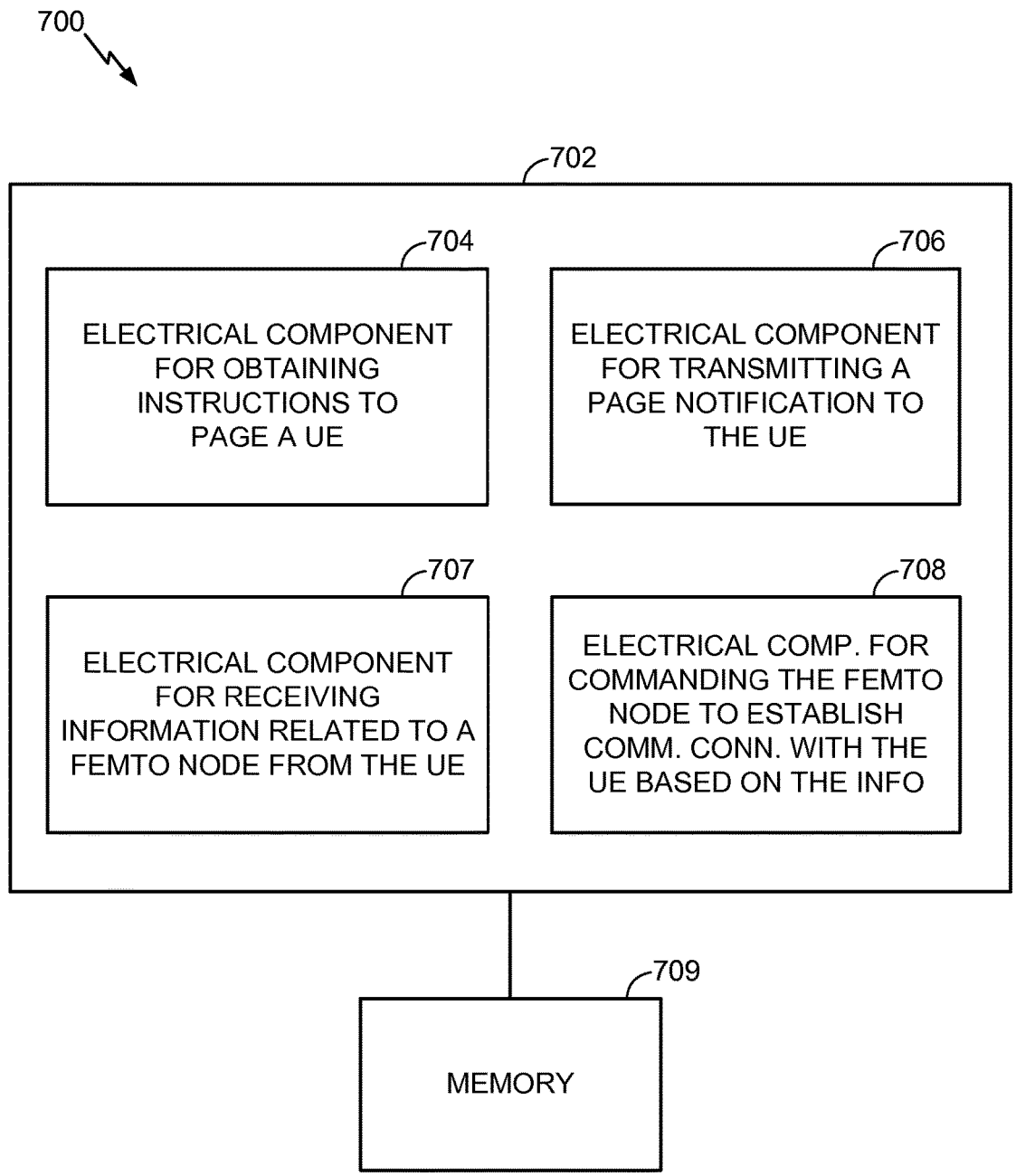
FIG. 7 is an electrical component diagram depicting aspects of a macro node according to the present disclosure.

With reference to FIG. 7, illustrated is a system 700 for efficient paging in a heterogeneous network. For example, system 700 can reside at least partially within a macro node. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component 704 for obtaining instructions to page a UE. For example, electrical component 704 can include communications component 270, as described above.

Further, logical grouping 702 can include an electrical component 706 for transmitting a page notification to the UE. For example, electrical component 706 can include page managing component 260, as described above. In addition, logical grouping 702 can include an electrical component 707 for receiving information related to a femto node from the UE. For example, electrical component 707 can include communications component 270 and/or service-providing device determining component 266, as described above. Moreover, logical grouping 702 can include an electrical component 708 for commanding the femto node to establish a communicative connection with the UE based on the information. For example, electrical component 708 can include communications component 270 and/or service-providing device determining component 266, as described above.

Additionally, system 700 can include a memory 709 that retains instructions for executing functions associated with the electrical components 704, 706, 707, and 708. While shown as being external to memory 709, it is to be understood that one or more of the electrical components 704, 706, 707, and 708 can exist within memory 709. In one example, electrical components 704, 706, 707, and 708 can comprise at least one processor, or each electrical component 704, 706, 707, and 708 can be a corresponding module of at least one processor. Moreover, in an additional or alternative example, electrical components 704, 706, 707, and 708 can be a computer readable medium, where each electrical component 704, 706, 707, and 708 can be corresponding code.

Figure 8:
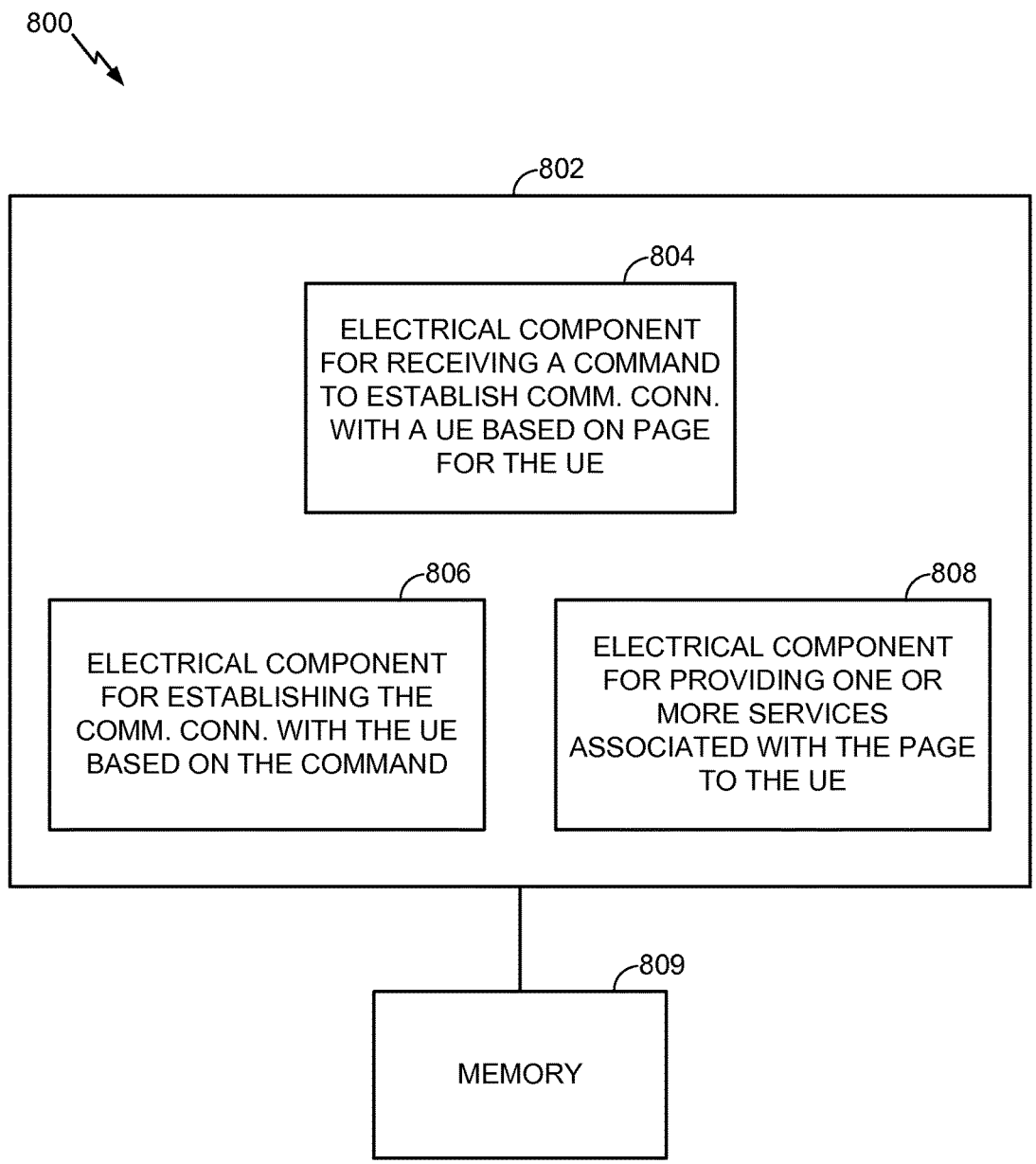
FIG. 8 is an electrical component diagram depicting aspects of a femto node according to the present disclosure.

With reference to FIG. 8, illustrated is a system 800 for efficient paging of UEs in heterogeneous networks. For example, system 800 can reside at least partially within a femto node. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component 804 for receiving a command to establish a communicative connection with a UE based on a page for the UE. For example, electrical component 804 can include communications component 244, as described above.

Further, logical grouping 802 can include an electrical component 806 for establishing the communicative connection with the UE based on the command. For example, electrical component 806 can include communications component 244, as described above. In addition, logical grouping 802 can include an electrical component 808 for providing one or more services associated with the page to the UE.

Additionally, system 800 can include a memory 809 that retains instructions for executing functions associated with the electrical components 804, 806, and 808. While shown as being external to memory 809, it is to be understood that one or more of the electrical components 804, 806, and 808 can exist within memory 809. In one example, electrical components 804, 806, and 808 can comprise at least one processor, or each electrical component 804, 806, and 808 can be a corresponding module of at least one processor. Moreover, in an additional or alternative example, electrical components 804, 806, and 808 can be a computer readable medium, where each electrical component 804, 806, and 808 can be corresponding code.

Figure 9:
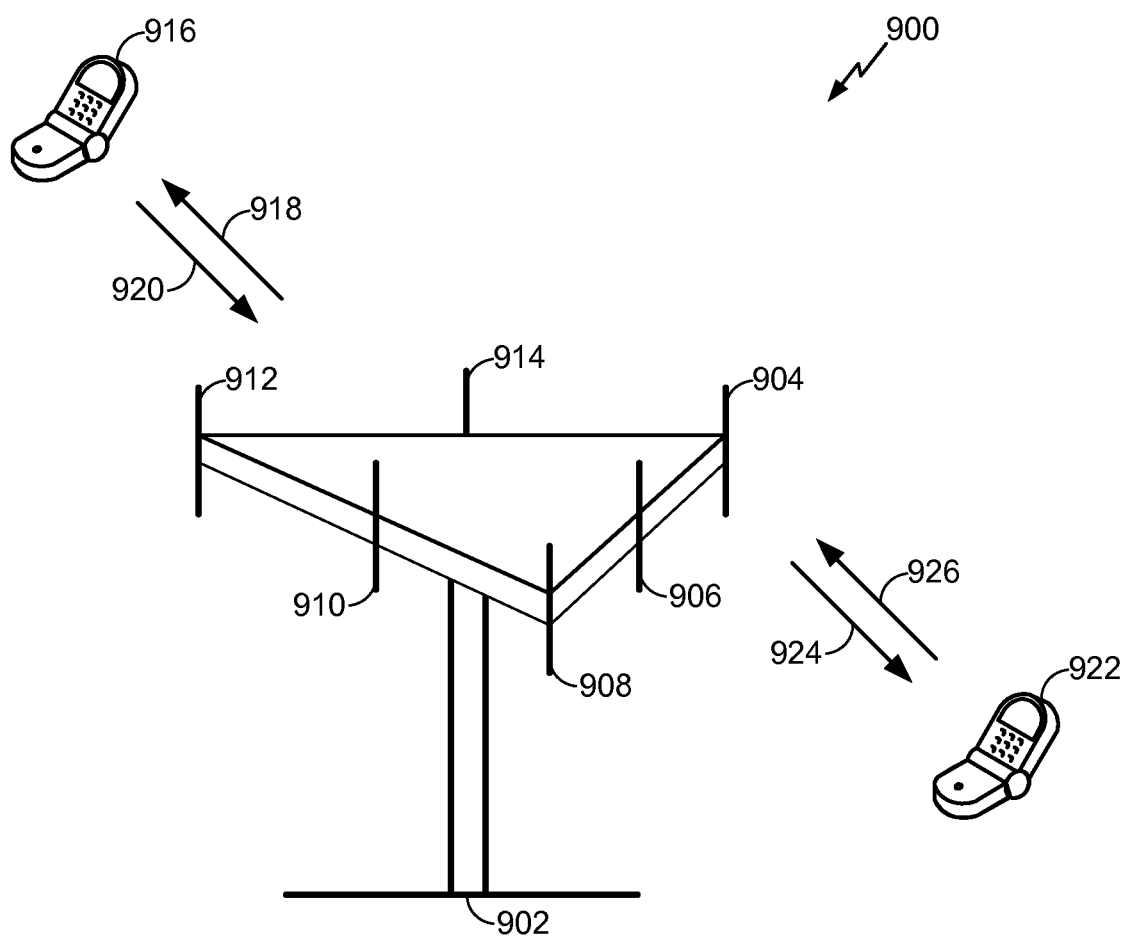
FIG. 9 is a block diagram of an example wireless communication system in accordance with various aspects set forth herein.

Referring now to FIG. 9, a wireless communication system 900 is illustrated in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated.

Base station 902 can communicate with one or more mobile devices such as mobile device 916 and mobile device 922; however, it is to be appreciated that base station 902 can communicate with substantially any number of mobile devices similar to mobile devices 916 and 922. Mobile devices 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, mobile device 916 is in communication with antennas 912 and 914, where antennas 912 and 914 transmit information to mobile device 916 over a forward link 918 and receive information from mobile device 916 over a reverse link 920. Moreover, mobile device 922 is in communication with antennas 904 and 906, where antennas 904 and 906 transmit information to mobile device 922 over a forward link 924 and receive information from mobile device 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to mobile devices in a sector of the areas covered by base station 902. In communication over forward links 918 and 924, the transmitting antennas of base station 902 can utilize beamforming to improve the signal-to-noise ratio of forward links 918 and 924 for mobile devices 916 and 922. Also, while base station 902 utilizes beamforming to transmit to mobile devices 916 and 922 scattered randomly through an associated coverage, mobile devices in neighboring cells can be subject to less interference as compared to a base station transmitting through a single antenna to all its mobile devices. Moreover, mobile devices 916 and 922 can communicate directly with one another using a peer-to-peer or ad hoc technology. According to an example, system 900 can be a multiple-input multiple-output (MIMO) communication system.

Figure 10:
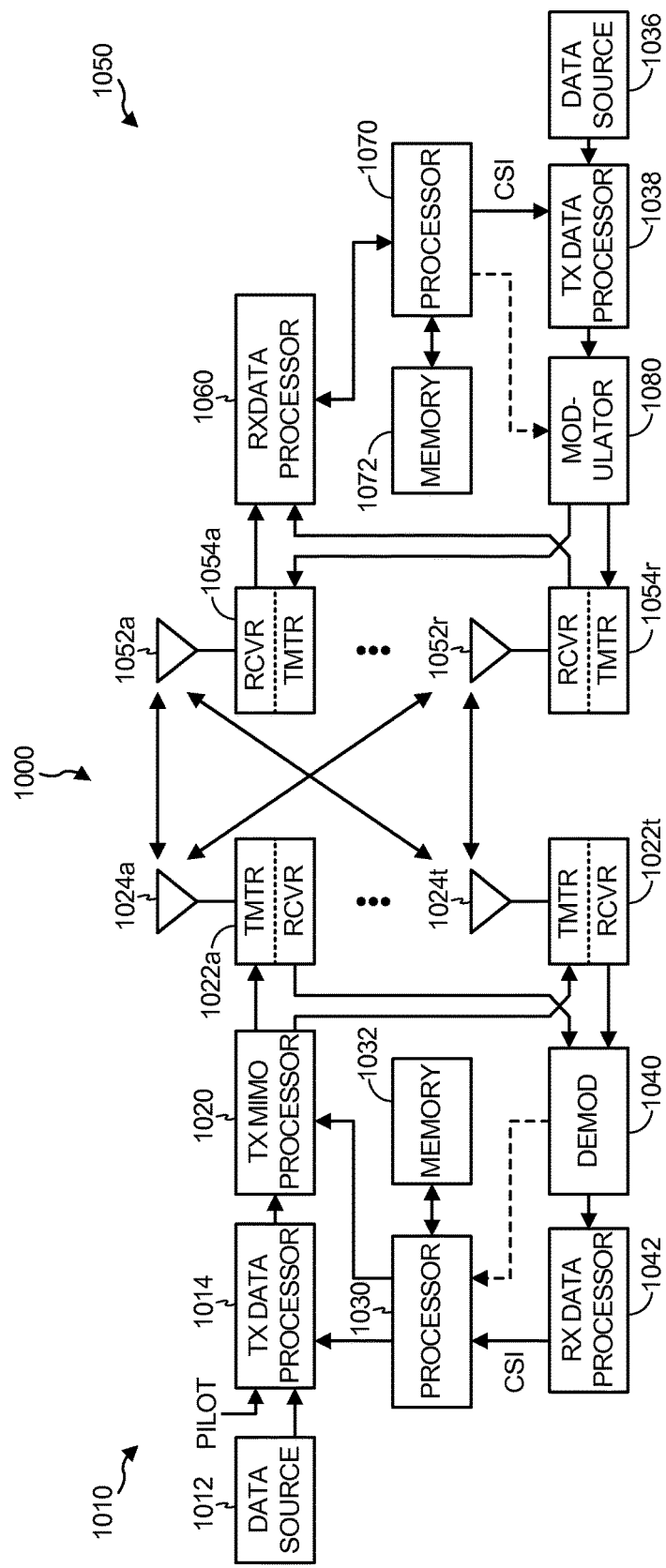
FIG. 10 is an illustration of an example wireless network environment that can be employed in conjunction with the various systems and methods described herein.

FIG. 10 shows an example wireless communication system 1000. The wireless communication system 1000 depicts one base station 1010, which can include a femto node, and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1, 2, and 6-9) and/or methods (FIGS. 3-5) described herein to facilitate wireless communication therebetween. For example, components or functions of the systems and/or methods described herein can be part of a memory 1032 and/or 1072 or processors 1030 and/or 1070 described below, and/or can be executed by processors 1030 and/or 1070 to perform the disclosed functions.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate a channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides NT modulation symbol streams to NT transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1022a through 1022t are transmitted from NT antennas 1024a through 1024t, respectively.

At mobile device 1050, the transmitted modulated signals are received by NR antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the NR received symbol streams from NR receivers 1054 based on a particular receiver processing technique to provide NT "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024a through 1024t, conditioned by receivers 1022a through 1022t, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform functionalities described herein to support efficient paging.

Figure 11:
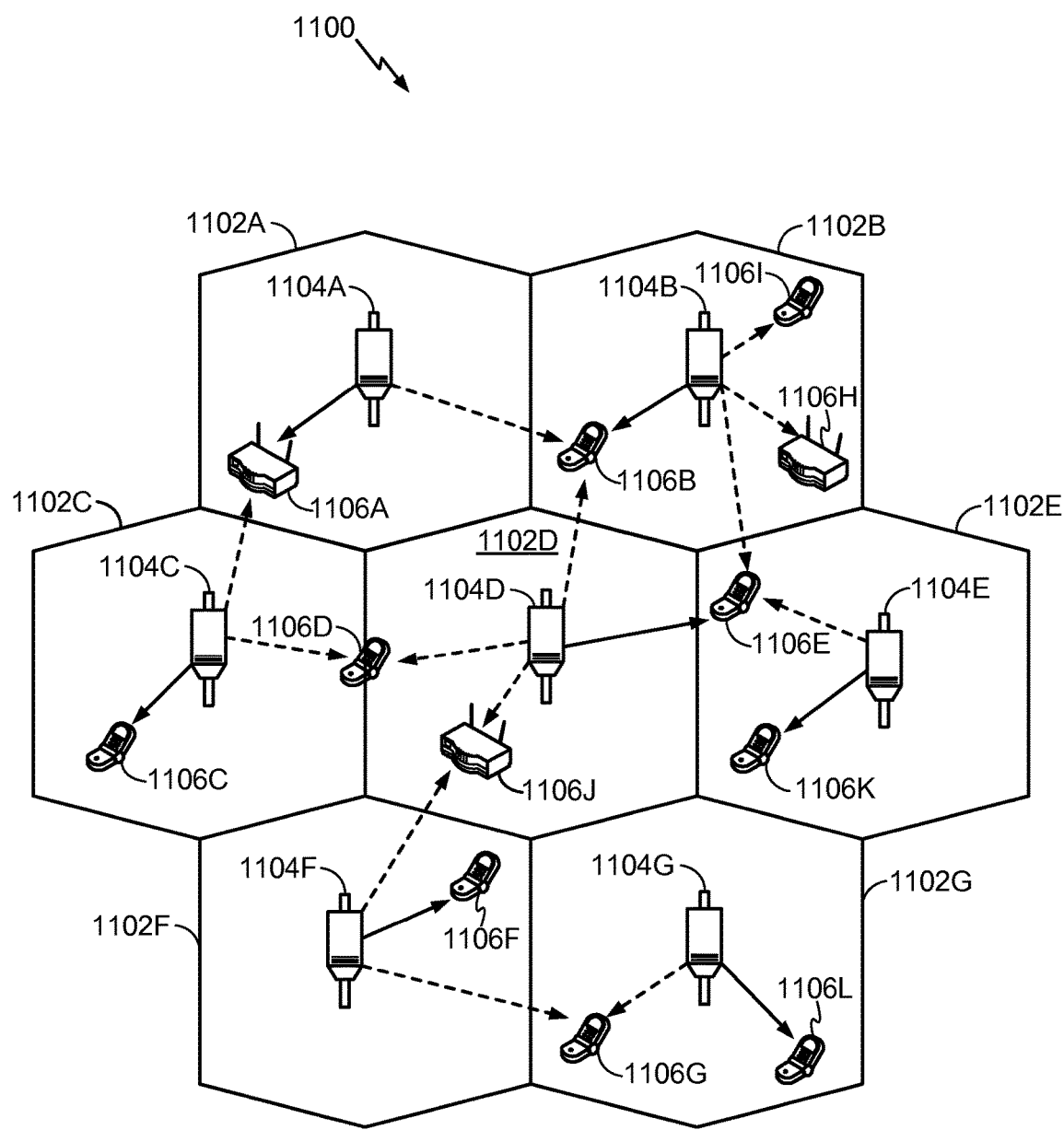
FIG. 11 illustrates an example wireless communication system, configured to support a number of devices, in which the aspects herein can be implemented.

FIG. 11 illustrates a wireless communication system 1100, configured to support a number of users, in which the teachings herein may be implemented. The system 1100 provides communication for multiple cells 1102, such as, for example, macro cells 1102A-1102G, with each cell being serviced by a corresponding access node 1104 (e.g., macro nodes 1104A-1104G). As shown in FIG. 11, access terminals 1106 (e.g., access terminals 1106A-1106L) can be dispersed at various locations throughout the system over time. Each access terminal 1106 can communicate with one or more access nodes 1104 on a forward link (FL) and/or a reverse link (RL) at a given moment, depending upon whether the access terminal 1106 is active and whether it is in soft handoff, for example. The wireless communication system 1100 can provide service over a large geographic region.

Figure 12:
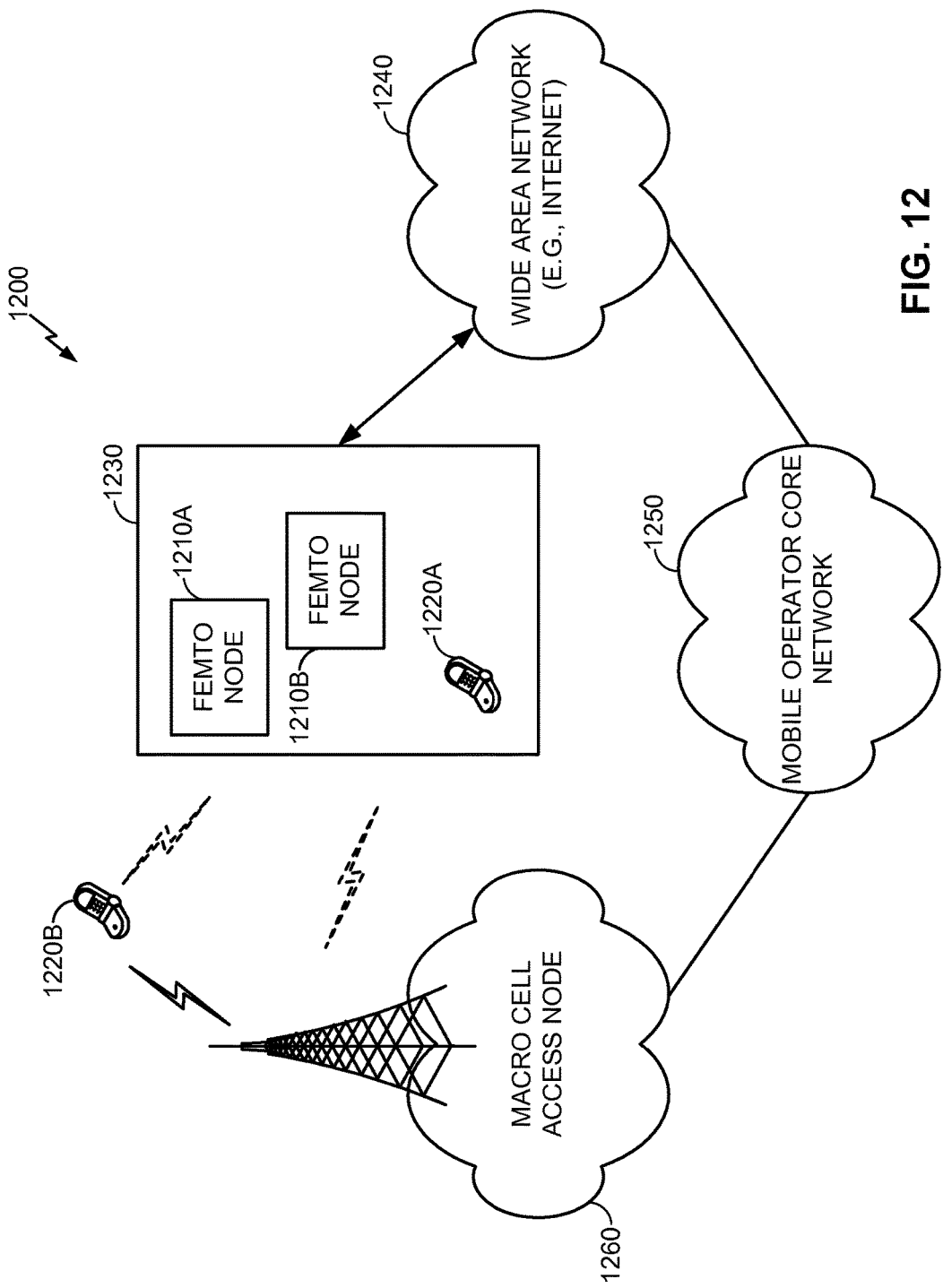
FIG. 12 is an illustration of an exemplary communication system to enable deployment of femto nodes within a network environment.

FIG. 12 illustrates an exemplary communication system 1200 where one or more femto nodes are deployed within a network environment. Specifically, the system 1200 includes multiple femto nodes 1210A and 1210B (e.g., femto nodes or H(e)NB) installed in a relatively small scale network environment (e.g., in one or more user residences 1230). Each femto node 1210 can be coupled to a wide area network 1240 (e.g., the Internet) and a mobile operator core network 1250 via a digital subscriber line (DSL) router, a cable modem, a wireless link, or other connectivity means (not shown). As will be discussed below, each femto node 1210 can be configured to serve associated access terminals 1220 (e.g., access terminal 1220A) and, optionally, alien access terminals 1220 (e.g., access terminal 1220B). In other words, access to femto nodes 1210 can be restricted such that a given access terminal 1220 can be served by a set of designated (e.g., home) femto node(s) 1210 but may not be served by any non-designated femto nodes 1210 (e.g., a neighbor's femto node).

Figure 13:
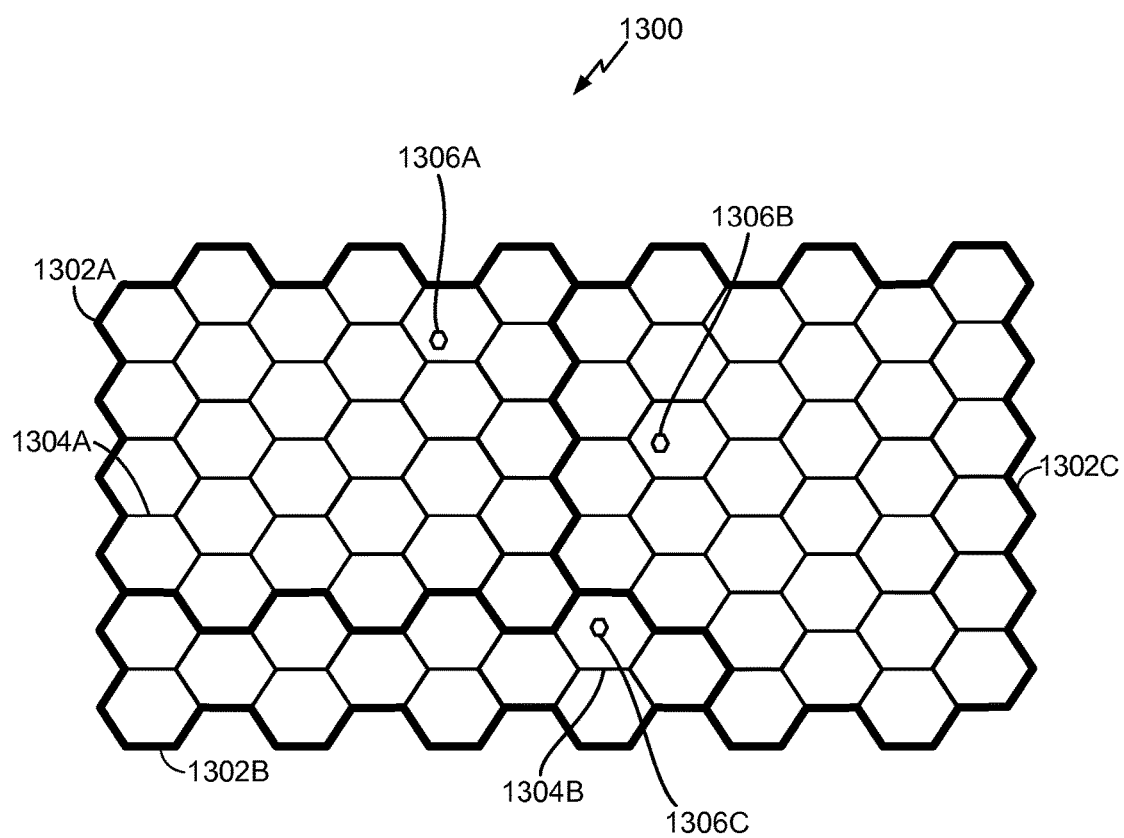
FIG. 13 illustrates an example of a coverage map having several defined tracking areas.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 (e.g., 1304A and 1304B) are represented by the hexagons. The tracking areas 1302 also include femto coverage areas 1306 (e.g., 1306A, 1306B, and 1306C). In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 can be defined within a given tracking area 1302 or macro coverage area 1304. Also, one or more pico coverage areas (not shown) can be defined within a given tracking area 1302 or macro coverage area 1304.

Referring again to FIG. 12, the owner of a femto node 1210 can subscribe to mobile service, such as, for example, 3G mobile service, offered through the mobile operator core network 1250. In another example, the femto node 1210 can be operated by the mobile operator core network 1250 to expand coverage of the wireless network. In addition, an access terminal 1220 can be capable of operating both in macro environments and in smaller scale (e.g., residential) network environments. Thus, for example, depending on the current location of the access terminal 1220, the access terminal 1220 can be served by a macro node access node 1260 or by any one of a set of femto nodes 1210 (e.g., the femto nodes 1210A and 1210B that reside within a corresponding user residence 1230). For example, when a subscriber is outside his home, he or she may be served by a standard macro node access node (e.g., node 1260) and when the subscriber is at home, he or she may be served by a femto node (e.g., node 1210A). Here, it should be appreciated that a femto node 1210 can be backward compatible with existing access terminals 1220.

A femto node 1210 can be deployed on a single frequency or, in the alternative, on multiple frequencies. Depending on the particular configuration, the single frequency or one or more of the multiple frequencies can overlap with one or more frequencies used by a macro node access node (e.g., node 1260). In some aspects, an access terminal 1220 can be configured to connect to a preferred femto node (e.g., the home femto node of the access terminal 1220) whenever such connectivity is possible. For example, whenever the access terminal 1220 is within the user's residence 1230, it can communicate with the home femto node 1210.

In some aspects, if the access terminal 1220 operates within the mobile operator core network 1250 but is not residing on its most preferred network (e.g., as defined in a preferred roaming list), the access terminal 1220 can continue to search for the most preferred network (e.g., femto node 1210) using Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1220 can limit the search for a specific band and channel. For example, the search for the most preferred system can be repeated periodically. Upon discovery of a preferred femto node, such as femto node 1210, the access terminal 1220 selects the femto node 1210 for camping within its coverage area.

A femto node can be restricted in some aspects. For example, a given femto node may only provide certain services to certain access terminals. In deployments with so-called restricted (or closed) association, a given access terminal can only be served by the macro node mobile network and a defined set of femto nodes (e.g., the femto nodes 1210 that reside within the corresponding user residence 1230). In some implementations, a femto node can be restricted to not provide, for at least one access terminal, at least one of: signaling, data access, registration, paging, or service.

In some aspects, a restricted femto node (which can also be referred to as a

Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that is authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc, where disks usually reproduce data magnetically, while discs usually reproduce data optically with lasers. Combinations of the above should also be included within the scope of computer-readable media.

The preceding description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention, which should only be defined by the following claims and all equivalents.

What is claimed is:

1. A method for wireless communication in a heterogeneous network, comprising:
monitoring, by a user equipment (UE) in idle mode, paging resources provided by a macro node;
discovering, by the UE in the idle mode and while the UE is camped on the macro node, presence of one or more femto nodes based on non-paging signals received from the one or more femto nodes;
storing, by the UE, information related to the one or more femto nodes including a cell identification of each of the one or more femto nodes and signal strength information of each of the one or more femto nodes;
receiving, while the UE is in the idle mode and after storing the information related to the one or more femto nodes, a page notification from the macro node over the paging resources;
in response to reception of the page notification from the macro node, providing, by the UE, the information related to the one or more femto nodes to the macro node; and
establishing, by the UE, a communicative connection with a selected femto node of the one or more femto nodes based on the information related to the one or more femto nodes,
wherein the macro node selects the selected femto node based on the information related to the one or more femto nodes, and wherein the selected femto node redirects the UE to the macro node after the UE switches to the idle mode after communicating at least one data packet over the communicative connection.

2. The method of claim 1, further comprising:
switching the UE to the idle mode on the macro node in response to disconnecting the communicative connection; and
monitoring the paging resources provided by the macro node based on the switching the UE to the idle mode.

3. The method of claim 1, wherein the non-paging signals comprise pilot signals or beacon signals.

4. The method of claim 1, wherein the establishing the communicative connection is based on a command to establish the communicative connection received from the macro node.

5. The method of claim 1, wherein the establishing the communicative connection is performed by the UE autonomously without a command to establish the communicative connection received from the macro node.

6. The method of claim 1, wherein the establishing is further based on a UE state corresponding to one of UE traveling speed, time of day, established daily UE schedule, or UE regimen.

7. An apparatus for wireless communication in a heterogeneous network, comprising:
means for monitoring, by a user equipment (UE) in idle mode, paging resources provided by a macro node;
means for discovering, by the UE in the idle mode and while the UE is camped on the macro node, presence of one or more femto nodes based on non-paging signals received from the one or more femto nodes;
means for storing, by the UE, information related to the one or more femto nodes including a cell identification of each of the one or more femto nodes and signal strength information of each of the one or more femto nodes;
means for receiving, while the UE is in the idle mode, a page notification from the macro node over the paging resources;
means for providing, by the UE, in response to reception of the page notification from the macro node, the information related to the one or more femto nodes to the macro node; and
means for establishing, by the UE, a communicative connection with a selected femto node of the one or more femto nodes based on the information related to the one or more femto nodes, wherein the macro node selects the selected femto node based on the information related to the one or more femto nodes, and wherein the selected femto node redirects the UE to the macro node after the UE switches to the idle mode after communication of at least one data packet over the communicative connection.

8. A non-transitory computer-readable medium comprising code, which, when executed by a processor, causes the processor to perform operations for wireless communication in a heterogeneous network, the non-transitory computer-readable medium comprising:
   code instructing a user equipment (UE) in idle mode to monitor paging resources provided by a macro node;
   code instructing the UE to discover, while the UE is in the idle mode and camped on the macro node, presence of one or more femto nodes based on non-paging signals received from the one or more femto nodes;
   code instructing the UE to store information related to the one or more femto nodes including a cell identification of each of the one or more femto nodes and signal strength information of each of the one or more femto nodes;
   code instructing the UE to receive, while the UE is in the idle mode, a page notification from the macro node over the paging resources;
   code instructing the UE to provide, in response to reception of the page notification from the macro node, the information related to the one or more femto nodes to the macro node; and
   code instructing the UE to establish a communicative connection with a selected femto node of the one or more femto nodes based on the information related to the one or more femto nodes,
   wherein the macro node selects the selected femto node based on the information related to the one or more femto nodes, and wherein the selected femto node redirects the UE to the macro node after the UE switches to the idle mode after communicating at least one data packet over the communicative connection.

9. An apparatus for wireless communication in a heterogeneous network, comprising:
   at least one processor of a user equipment (UE); and
   memory coupled to the at least one processor, wherein the at least one processor is configured to:
      monitor, while the UE is in idle mode, paging resources provided by a macro node;
      discover, while the UE is in the idle mode and camped on the macro node, presence of one or more femto nodes based on non-paging signals received from the one or more femto nodes;
      store information related to the one or more femto nodes including a cell identification of each of the one or more femto nodes and signal strength information of each of the one or more femto nodes;
      receive, while the UE is in the idle mode, a page notification from the macro node over the paging resources;
      provide, in response to reception of the page notification from the macro node, the information related to the one or more femto nodes to the macro node; and
      establish a communicative connection with a selected femto node of the one or more femto nodes based on the information related to the one or more femto nodes,
   wherein the macro node selects the selected femto node based on the information related to the one or more femto nodes, and wherein the selected femto node redirects the UE to the macro node after the UE switches to the idle mode after communicating at least one data packet over the communicative connection.

10. A method for wireless communication in a heterogeneous network, comprising:
    obtaining, at a macro node, instructions to page a user equipment (UE) in idle mode;
    transmitting, by the macro node, over paging resources monitored by the UE while the UE is in the idle mode, a page notification to the UE while the UE is in the idle mode based on the obtained instructions;
    receiving, at the macro node, information related to one or more femto nodes from the UE based on the page notification, the information related to the one or more femto nodes including a cell identification of each of the one or more femto nodes and signal strength information of each of the one or more femto nodes, wherein the UE discovers, while the UE is in the idle mode and camped on the macro node, presence of the one or more femto nodes based on non-paging signals received from the one or more femto nodes and stores the information related to the one or more femto nodes, and wherein the UE provides the information related to the femto node to the macro node in response to reception of the page notification from the macro node; and
    commanding, by the macro node, a selected femto node of the one or more femto nodes to establish a communicative connection with the UE based on the information related to the one or more femto nodes,
    wherein the macro node selects the selected femto node based on the information related to the one or more femto nodes, and wherein the selected femto node redirects the UE to the macro node after the UE switches to the idle mode after communicating at least one data packet over the communicative connection.

11. The method of claim 10, further comprising determining whether the macro node or the selected femto node is to process data associated with the page notification.

12. The method of claim 11, wherein the determining is at least partially based on the information.

13. The method of claim 10, further comprising commanding the UE to establish the communicative connection with the selected femto node based on the information.

14. An apparatus for wireless communication in a heterogeneous network, comprising:
    means for obtaining, at a macro node, instructions to page a user equipment (UE) in idle mode;
    means for transmitting, over paging resources monitored by the UE while the UE is in the idle mode, a page notification to the UE while the UE is in the idle mode based on the obtained instructions;
    means for receiving information related to one or more femto nodes from the UE based on the page notification, the information related to the one or more femto nodes including a cell identification of each of the one or more femto nodes and signal strength information of each of the one or more femto nodes, wherein the UE discovers, while the UE is in the idle mode and camped on the macro node, presence of the one or more femto nodes based on non-paging signals received from the one or more femto nodes and stores the information related to the one or more femto nodes, and wherein the UE provides the information related to the one or more femto nodes to the macro node in response to reception of the page notification from the macro node; and means for commanding a selected femto node of the one or more femto nodes to establish a communicative connection with the UE based on the information related to the one or more femto nodes, wherein the macro node selects the selected femto node based on the information related to the one or more femto nodes, and wherein the selected femto node redirects the UE to the macro node after the UE switches to the idle mode after communicating at least one data packet over the communicative connection.

15. A non-transitory computer-readable medium comprising code, which, when executed by a processor, causes the processor to perform operations for wireless communication in a heterogeneous network, the non-transitory computer-readable medium comprising:

code instructing a macro node to obtain instructions to page a user equipment (UE) in idle mode;

code instructing the macro node to transmit, over paging resources monitored by the UE while the UE is in the idle mode, a page notification to the UE while the UE is in the idle mode based on the obtained instructions;

code instructing the macro node to receive information related to one or more femto nodes from the UE based on the page notification, the information related to the one or more femto nodes including a cell identification of each of the one or more femto nodes and signal strength information of each of the one or more femto nodes, wherein the UE discovers, while the UE is in the idle mode and camped on the macro node, presence of the one or more femto nodes based on non-paging signals received from the one or more femto nodes and stores the information related to the one or more femto nodes, and wherein the UE provides the information related to the one or more femto nodes to the macro node in response to reception of the page notification from the macro node; and code instructing the macro node to command a selected femto node of the one or more femto nodes to establish a communicative connection with the UE based on the information related to the one or more femto nodes wherein the macro node selects the selected femto node based on the information related to the one or more femto nodes, and wherein the selected femto node redirects the UE to the macro node after the UE switches to the idle mode after communicating at least one data packet over the communicative connection.

16. An apparatus for wireless communication in a heterogeneous network, comprising:

at least one processor of a macro node; and memory coupled to the at least one processor, wherein the at least one processor is configured to:

obtain instructions to page a user equipment (UE) in idle mode;

transmit, over paging resources monitored by the UE while the UE is in the idle mode, a page notification to the UE while the UE is in the idle mode based on the obtained instructions;

receive information related to one or more femto nodes from the UE based on the page notification, the information related to the one or more femto nodes including a cell identification of each of the one or more femto nodes and signal strength information of each of the one or more femto nodes, wherein the UE discovers, while the UE is in the idle mode and camped on the macro node, presence of the one or more femto nodes based on non-paging signals received from the one or more femto nodes and stores the information related to the one or more femto nodes, and wherein the UE provides the information related to the one or more femto nodes to the macro node in response to reception of the page notification from the macro node; and command a selected femto node of the one or more femto nodes to establish a communicative connection with the UE based on the information related to the one or more femto nodes, wherein the macro node selects the selected femto node based on the information related to the one or more femto nodes, and wherein the selected femto node redirects the UE to the macro node after the UE switches to the idle mode after communicating at least one data packet over the communicative connection.

17. A method for wireless communication in a heterogeneous network, comprising:

broadcasting, at a femto node among one or more femto nodes, non-paging signals;

receiving, at the femto node from a macro node, a command to establish a communicative connection with a user equipment (UE), wherein the UE discovers, while the UE is in the idle mode and camped on the macro node, presence of the femto node based on the non-paging signals received from the femto node and stores information related to the femto node including a cell identification and signal strength information of each of the one or more femto nodes, and wherein the UE provides the information related to the femto node to the macro node in response to reception of a page notification sent by the macro node to the UE, while the UE is in idle mode, over paging resources monitored by the UE while the UE is in the idle mode, and wherein the macro node sends the command to the femto node based on the information related to the femto node;

establishing, by the femto node, the communicative connection with the UE based on the command, wherein the command is in response to the macro node selecting the femto node among the one or more femto nodes;

providing, by the femto node, one or more services associated with the page notification to the UE over the communicative connection, and redirecting the UE to the macro node after the UE switches to the idle mode after communicating at least one data packet over the communicative connection.

18. The method of claim 17, further comprising redirecting the UE to the macro node based on completion of the providing one or more services.

19. An apparatus for wireless communication in a heterogeneous network, comprising:

means for broadcasting, at a femto node among one or more femto nodes, non-paging signals;

means for receiving, at the femto node from a macro node, a command to establish a communicative connection with a user equipment (UE), wherein the UE discovers, while the UE is in the idle mode and camped on the macro node, presence of the femto node based on the non-paging signals received from the femto node and stores information related to the femto node including a cell identification and signal strength information of each of the one or more femto nodes, and wherein the UE provides the information related to the femto node to the macro node in response to reception of a page notification sent by the macro node to the UE, while the UE is in idle mode, over paging resources monitored by the UE while the UE is in the idle mode, and wherein the macro node sends the command to the femto node based on the information related to the femto node;

means for establishing the communicative connection with the UE based on the command wherein the command is in response to the macro node selecting the femto node among the one or more femto nodes;

means for providing one or more services associated with the page notification to the UE, over the communicative connection, and and means for redirecting the UE to the macro node after the UE switches to the idle mode after communicating at least one data packet over the communicative connection.

20. The apparatus of claim 19, further comprising means for redirecting the UE to the macro node based on completion of the provision of the one or more services.

21. A non-transitory computer-readable medium comprising code, which, when executed by a processor, causes the processor to perform operations for wireless communication in a heterogeneous network, the non-transitory computer-readable medium comprising:

code for broadcasting, at a femto node among one or more femto nodes, non-paging signals;

code instructing the femto node to receive, from a macro node, a command to establish a communicative connection with a user equipment (UE), wherein the UE discovers, while the UE is in the idle mode and camped on the macro node, presence of the femto node based on the non-paging signals received from the femto node and stores information related to the femto node including a cell identification and signal strength information of each of the one or more femto nodes, and wherein the UE provides the information related to the femto node to the macro node in response to reception of a page notification sent by the macro node to the UE, while the UE is in idle mode, over paging resources monitored by the UE while the UE is in the idle mode, and wherein the macro node sends the command to the femto node based on the information related to the femto node;

code for establishing the communicative connection with the UE based on the command wherein the command is in response to the macro node selecting the femto node among the one or more femto nodes;

code for providing one or more services associated with the page notification to the UE, over the communicative connection, and code for redirecting the UE to the macro node after the UE switches to the idle mode after communicating at least one data packet over the communicative connection.

22. The non-transitory computer-readable medium of claim 21, wherein the non-transitory computer-readable medium further comprises code for redirecting the UE to the macro node based on completion of the provision of the one or more services.

23. An apparatus for wireless communication in a heterogeneous network, comprising:

at least one processor; and memory coupled to the at least one processor, wherein the at least one processor is configured to:

broadcast, at a femto node among one or more femto nodes, non-paging signals;

receive, at the femto node from a macro node, a command to establish a communicative connection with a user equipment (UE), wherein the UE discovers, while the UE is in the idle mode and camped on the macro node, presence of the femto node based on the non-paging signals received from the femto node and stores information related to the femto node including a cell identification and signal strength information of each of the one or more femto nodes, and wherein the UE provides the information related to the femto node to the macro node in response to reception of a page notification sent by the macro node to the UE, while the UE is in idle mode, over paging resources monitored by the UE while the UE is in the idle mode, and wherein the macro node sends the command to the femto node based on the information related to the femto node;

establish the communicative connection with the UE based on the command, wherein the command is in response to the macro node selecting the femto node among the one or more femto nodes; and provide one or more services associated with the page notification to the UE over the communicative connection, and redirect the UE to the macro node after the UE switches to the idle mode after communicating at least one data packet over the communicative connection.

24. The apparatus of claim 23, wherein the at least one processor is further configured to redirect the UE to the macro node based on completion of the provision of the one or more services.

* * * * *